United States Patent [19]

Johannsen

[11] Patent Number: 5,703,328
[45] Date of Patent: Dec. 30, 1997

[54] CABLE LEAD-IN

[76] Inventor: Olaf Johannsen, Sundgade 22, Sonderborg, Denmark, DK-6400

[21] Appl. No.: 500,949
[22] PCT Filed: Jan. 20, 1994
[86] PCT No.: PCT/DK94/00036
  § 371 Date: Sep. 21, 1995
  § 102(e) Date: Sep. 21, 1995
[87] PCT Pub. No.: WO94/18734
  PCT Pub. Date: Aug. 18, 1994

[30] Foreign Application Priority Data

Feb. 12, 1993 [DK] Denmark .................... 0164/93

[51] Int. Cl.$^6$ ................................. H02G 3/18
[52] U.S. Cl. ......................... 174/65 R; 220/3.6
[58] Field of Search ................ 174/65 R, 65 G, 174/135; 52/220.8; 220/3.6

[56] References Cited

U.S. PATENT DOCUMENTS 2,118,672  5/1938  Green .
4,789,759  12/1988  Jones ..................... 174/65 SS

FOREIGN PATENT DOCUMENTS 141 519   4/1980  Denmark .
2 601 433  1/1988  France .

*Primary Examiner*—Hyung S. Sough
*Assistant Examiner*—Dhiru R. Patel
*Attorney, Agent, or Firm*—Jacobson, Price, Holman & Stern, PLLC

[57] ABSTRACT

A cable lead-in including an upper part and a lower part. The upper part and the lower part are clamped together by a threaded joint in an opening in a wall on a casing around current conductors, which are connected via an electric cable to other current conductors outside the casing. The upper part is formed with a through duct, which has an outer funnel-shaped duct section and an inner threaded section. A seat for a sealing ring is formed between these two sections. A nipple having a strain relief strap is screwed into the threaded section, whereby the sealing ring is pressed sealingly against both the seat and the cable. The funnel-shaped duct section serves to protect the cable against damage by bending in operation. The nipple has a hexagonal head, and at least one of a plurality of blind holes in the upper part accommodates a self-tapping screw whose head is spaced closely from one of the faces of the hexagonal nipple head. This protects the nipple against rotation, which might cause the passage of the cable through the sealing ring to become non-tight. All the components of the cable lead-in are well protected behind the wall of the casing while only a relatively low flange on the upper part is present on the outer side of the wall. In practice, this flange cannot be broken off or offer a foothold to a person who might try to stand on the flange.

10 Claims, 2 Drawing Sheets

5,703,328

CABLE LEAD-IN

FIELD OF THE INVENTION

The invention concerns a cable lead-in mounted in an opening in a wall of a casing for current conductors, the cable lead-in comprising an outer part and an inner part, wherein the outer part includes a portion passed through said opening and a through duct through which an electric cable may be run for connection with the current conductors, at least a section of said duct being formed as a funnel, and wherein the outer part is provided with a flange which engages one side of said wall around said opening, the inner part being assembled with the outer part to clamp the outer part in the opening of the casing wall.

BACKGROUND OF THE INVENTION

According to present heavy current regulations stripped current conductors in e.g. a terminal block have to be duly shielded against unintentional touch by means of a suitable casing, e.g. a box. When the current conductors are to be connected to other current conductors outside the casing via an electric cable, the cable must therefore be drawn through an opening in the wall of the casing. To prevent the cable from being damaged by the edge of the opening and/or being disconnected from the current conductors during this operation, this opening is normally provided with a threaded cable clamp including a strain relief member and usually also a sealing ring as well as a break preventing funnel which is provided on the outermost end part of the threaded joint opposite the current conductors.

A cable lead-in of this type is known from U.S. Pat. No. 2,118,672. This cable lead-in has an outer part 5 and an inner part 26 for mounting in an opening in a wall 3. The upper part has a duct 9 which is formed as a funnel and a flange 23 whose height is smaller than the length of the funnel. The flange engages the outer side of the wall around the opening with the funnel converging in the direction of she conductors.

This known cable lead-in is thus composed of several coaxial components which are arranged successively in the longitudinal direction. The cable entry is therefore relatively long, and since it is moreover fixed freely cantilevered in the wall of the casing, it is very liable to be broken off completely or partly. This applies especially to cable entries to mobile machinery, such as e.g. industrial vacuum cleaners, welding units and measuring tables, which are often relatively low with low cable entries which will easily abut obstacles when the machine in question is moved, just as the cable entry may be broken if a person steps on it.

If the cable entry is broken, the cable relief member is usually rendered inoperative, involving the risk of the cable being torn loose from its connection to the current conductors such that the power supply to the machine is interrupted. Since the stripped conductor ends of the cable are now exposed, this may moreover result in shortcircuiting and current leakage to machine parts which will thereby become conductive. The latter situation is extremely dangerous, since a person touching the conducting parts may be injured and in some cases even so seriously that it may proove fatal.

Accordingly, there is a need for an improved cable lead-in of the type mentioned in the opening paragraph, which, when mounted on even mobile machinery, cannot in practice be broken by arbitrary impacts, or because a person steps on it.

SUMMARY OF THE INVENTION

The novel and unique features of the invention achieving this object are that said flange engages the outer side of said wall such that only the flange is present on the outer side of the wall, said funnel is formed in at least the outermost section of said duct and converges inwardly in a direction toward the inside of the casing, and said flange has a smaller height than the axial extent of the funnel. In contrast to the conventional structures, the major part of the cable lead-in is now protected behind the casing, while actual flange which is present on the outer side of the casing. However, the flange per se is so low that it cannot be broken off by arbitrary impacts, nor does it present sufficient space for a person to get a foothold.

When the cable is subjected to a lateral pull, the inwardly converging funnel of the outer part protects the cable against being bent or deflected more than it can stand. Further, to satisfy the additional requirements which must usually be made with respect to a cable lead-in of this type, the cable lead-in may advantageously be equipped with a threaded cable clamp, which usually comprises both a cable relief member and a sealing ring to ensure that the cable is sealingly run through. However, according to the invention the threaded cable clamp is now arranged in axial extension of the outer part end which is positioned behind the casing, which thus serves to protect all the vulnerable parts of the assembled structure against being damaged.

In a particularly simple and advantageous embodiment of the invention the threaded cable clamp may comprise an interiorly threaded innermost section of the duct of the outer part and a nipple to be screwed into these threads, and a seat for the sealing ring may be provided between this threaded section and the funnel-shaped section of the duct, said nipple being adapted to press the sealing ring tightly against the seal as well as the cable when being clamped.

BRIEF DESCRIPTION OF THE DRAWINGS

Further advantageous embodiments as well as advantages achieved by means of the invention will be explained more fully below with reference to the drawing, which shows a structure by way of example, and in which.

DETAILED DESCRIPTION OF THE PREFERRED EMBODIMENTS

Figure 1:
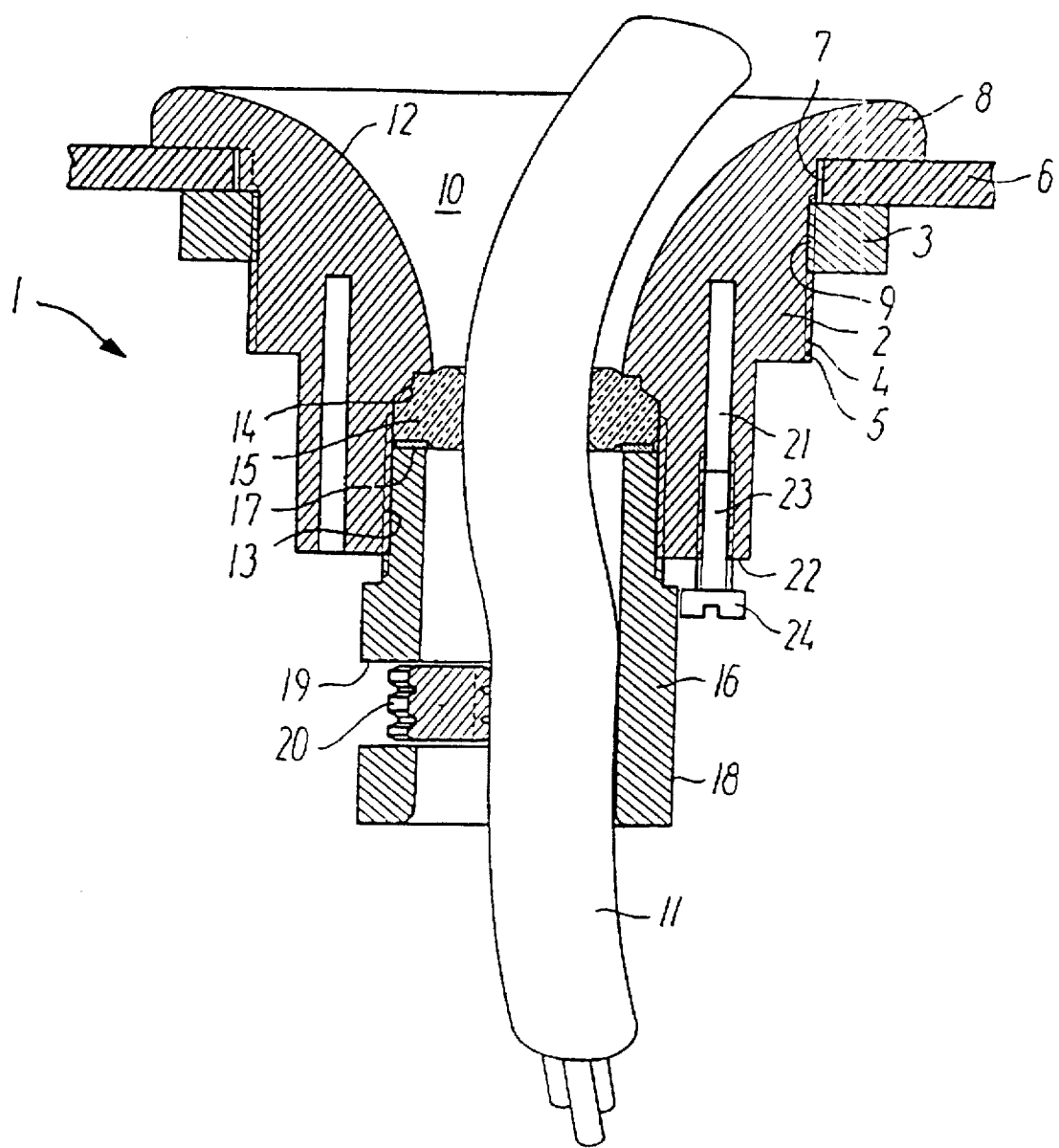
FIG. 1 is a cross-section through a cable lead-in according to the invention with mounted threaded cable clamp.

FIG. 1 shows a typical cable lead-in according to the invention. The cable lead-in, which is generally designated by the reference numeral 1, comprises an outer part 2 and an inner part 3. The outer part 2 has a cylindrical member 4 with external threads 5. The cylindrical member 4 is passed through the opening 7 in a wall 6 of a casing to protect some current conductors (not shown) in e.g. a terminal block. In the mounted state the outer part 2 engages the outer side of the wall 6 with a flange 8. In the shown case the inner part 3 is in the form of a nut and serves to clamp the outer part 2 fixedly in the opening 7 of the casing wall 6.

The outer part 2 is formed with a through duct 10 through which a cable 11 is run; the cable has been or is to be connected to the current conductors (not shown) behind the wall 6 of the casing. This duct 10 has an outermost, funnel-shaped section 12 to ensure that when pulled laterally the cable is bent softly and gently without being damaged. The duct 10 moreover has an innermost threaded section 13, and a seat 14 for an elastomeric sealing ring 15, which may e.g. be of rubber, is formed between these two sections 12, 13. A nipple 16, which has been threaded into the threaded section 13 of the duct 10, presses with its end face via a ring disc 17 against the elastomeric sealing ring 15 which is thereby deformed so as to sealingly engage both the seat 14 and the cable 11. This ensures that the cable is run through sealingly.

The nipple 16 has a head 18 which may e.g. be hexagonal such that the nipple can be clamped by means of a key. This head is formed with a strain relief member which, in the shown case, is described in the applicant's Danish patent No. 161996, and which comprises a transverse duct 19 provided in the nipple head 18 and a strain relief strap 20 run in parallel in said transverse duct.

Figure 2:
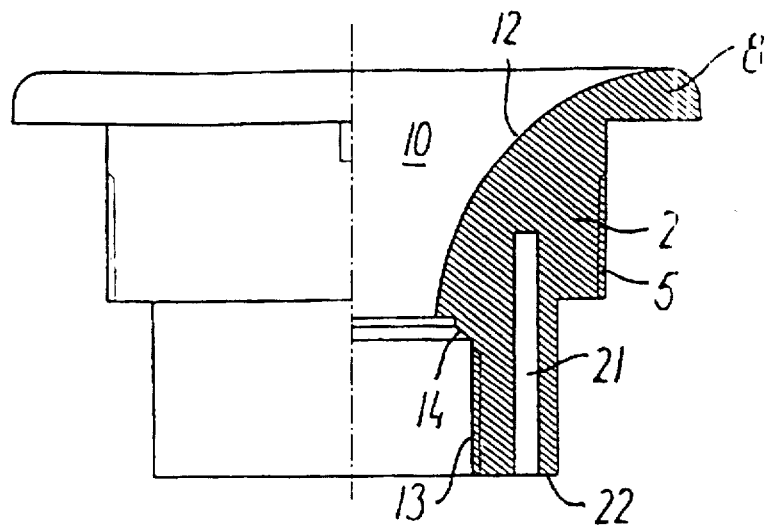
FIG. 2 is a partially sectional view of the outer part of the cable lead-in shown in FIG. 1.
Figure 3:
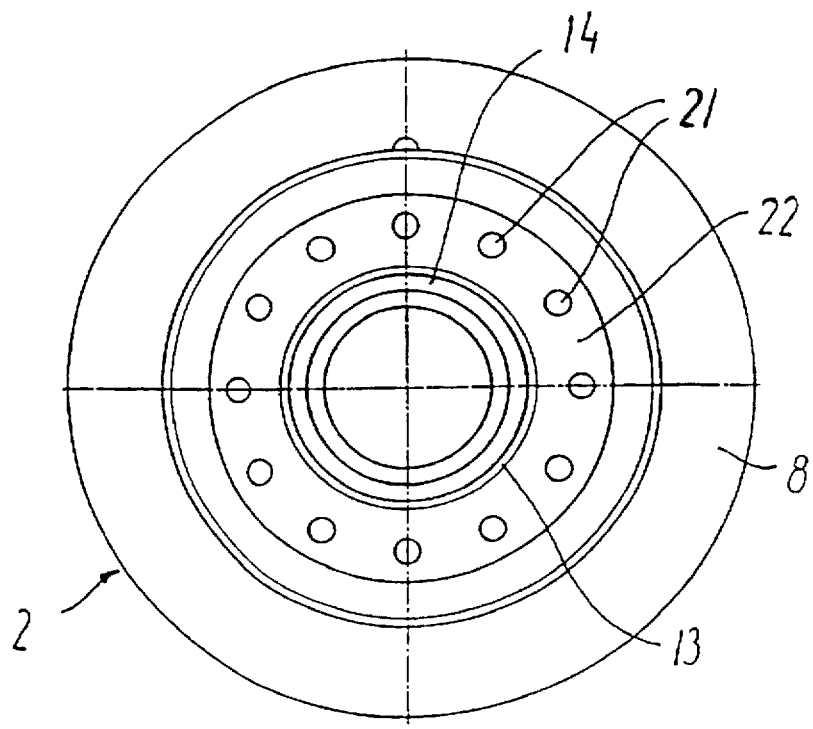
FIG. 3 is an end view of the same.

As will be seen from FIGS. 2 and 3, a plurality of blind holes 21, which terminate in the innermost end 22 of the outer part 2, are provided in a circle around the duct 10. These blind holes form recesses in the outer part 2, which may e.g. be moulded of plastics. The presence of the blind holes is advantageous when the outer part is to be moulded, and serves in this connection to neutralize tensions than might occur during cooling. One of the blind holes 21 accommodates a self-tapping screw 33 having a head 24 which is spaced closely from one of the hexagonal faces of the nipple head 18. This prevents a cable, which has been fixed in the nipple by means of a strain relief strap, from rotating the nipple such that the sealing ring 15 no longer sealingly engages the cable 11 if this is twisted.

As will be seen, the cable lead-in of the invention satisfies all the requirements which must be made with respect to a conventional cable lead-in of this type. Thus, the cable lead-in has a break prevention funnel protecting the cable against damage when being bent, as well as a sealing ring to ensure sealing run-through of the cable and a strain relief member to protect the cable against being torn loose from its connection to the current conductors which are protected behind the wall of the casing. In the cable lead-in of the invention all vulnerable components are also protected behind this wall, while only the flange 8 is present on the outer side of the wall. However, the height of the flange 8 is so low that in practice the flange cannot be broken off or offer a foothold to a person who might try to stand on it.

For the flange to have a sufficient strength while being too low to offer a foothold, the ratio of the axial extent of the funnel to the height of the flange may advantageously be in the range between 2–7, preferably between 3–6 and in particular between 4–5. In a particularly advantageous embodiment the height of the flange is moreover less than 10 mm.

Although the joint between the outer part 2 and the inner part 3 has been described above and shown in the drawing as a threaded joint, it may be of any other suitable type. For example, the inner part 3 may be in the form of a split ring disc which is passed into a groove in the outer part, and the outer part per se may be provided with a snap lock mechanism having barbs to grip directly behind the rear side of the wall 6. If the wall 6 moverover has a sufficient thickness, its opening 7 may be provided with interior threads for the screwing-in of the outer part.

I claim:

1. A cable lead-in mounted in an opening in a wall of a casing for current conductors, the cable lead-in comprising an outer part and an inner part, said outer part including a portion passed through said opening and a through duct through which an electric cable may be run for connecting with the current conductors, and said outer part being provided with a flange which engages one side of said wall around said opening, said inner part being assembled with said outer part to clamp said outer part in the opening of said wall, said flange engaging an outer side of said wall such that only the flange is present on the outer side of the wall, a funnel being formed in at least an outermost section of said duct and converges inwardly in a direction toward an inside of the casing, and said flange having a smaller height than an axial extent of the funnel.

2. A cable lead-in according to claim 1, wherein a threaded cable clamp is arranged on an innermost side of the outer part facing the current conductors.

3. A cable lead-in according to claim 2, wherein the threaded cable clamp comprises an interiorly threaded innermost section of the outer part and a nipple to be screwed into said threaded intermost section.

4. A cable lead-in according to claim 2, wherein the threaded cable clamp moreover comprises a sealing ring for sealing the cable, and a seat for said sealing ring is provided between said outermost funnel-shaped section of the duct and said innermost threaded section, and that a nipple is adapted to press said sealing ring sealingly against both said seat and the cable when being clamped.

5. A cable lead-in according to claim 2, wherein the threaded cable clamp comprises a strain relief member, and said strain relief member is provided in a nipple section extending freely inwardly from said outer part when a nipple is screwed into it.

6. A cable lead-in according to claim 1, wherein a ratio of the axial extent of the funnel to a height of the flange is in a range between 2–7.

7. A cable lead-in according to claim 1, wherein a height of the flange is less than 10 mm.

8. A cable lead-in according to claim 1, wherein a joint between the outer part and the inner part is a threaded joint.

9. A cable lead-in according to claim 1, wherein a plurality of blind holes, which terminate in an end face of the outer part facing toward the current conductors, are provided in the outer part in a circle around its duct.

10. A cable lead-in according to claim 9, wherein at least one face extending in parallel with the axis of a nipple is provided exteriorly on a nipple section which extends freely inwardly from the outer part when the nipple is screwed into it, and at at least one of a plurality of blind holes accommodates a protruding screw or pin, said screw or pin is arranged at such a radial distance from an axis of the nipple that said at least one face abuts the screw upon rotation.

* * * * *